(12) United States Patent
Murar et al.

(10) Patent No.: US 9,963,107 B2
(45) Date of Patent: *May 8, 2018

(54) SYSTEM FOR REMOTELY OPENING A LAND-VEHICLE DOOR

(71) Applicant: JVIS-USA, LLC, Sterling Heights, MI (US)

(72) Inventors: Jason T. Murar, Macomb, MI (US); Darius J. Preisler, Macomb, MI (US); David R. Syrowik, Milford, MI (US)

(73) Assignee: JVIS-USA, LLC, Sterling Heights, MI (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/271,415

(22) Filed: Sep. 21, 2016

(65) Prior Publication Data

US 2017/0232930 A1 Aug. 17, 2017

Related U.S. Application Data

(63) Continuation-in-part of application No. 15/045,847, filed on Feb. 17, 2016, now Pat. No. 9,593,522, and (Continued)

(51) Int. Cl.
*B60R 25/24* (2013.01)
*B60Q 5/00* (2006.01)
*B60Q 1/32* (2006.01)

(52) U.S. Cl.
CPC .............. *B60R 25/24* (2013.01); *B60Q 1/32* (2013.01); *B60Q 5/005* (2013.01); *B60Q 2400/40* (2013.01); *B60R 2325/20* (2013.01)

(58) Field of Classification Search
CPC ..... B60R 25/24; B60R 2325/20; B60Q 5/005; B60Q 1/32; B60Q 2400/40
See application file for complete search history.

(56) References Cited

U.S. PATENT DOCUMENTS 6,571,193 B1 5/2003 Unuma et al.
7,202,775 B2 4/2007 Yezersky et al.
(Continued)

FOREIGN PATENT DOCUMENTS

WO    WO 2016011125 A1 * 1/2016 ......... G07C 9/00309

OTHER PUBLICATIONS

Notice of Allowance, U.S. Appl. No. 15/045,847, dated Jan. 18, 2017.
(Continued)

*Primary Examiner* — Thomas Ingram
(74) *Attorney, Agent, or Firm* — Brooks Kushman P.C.

(57) ABSTRACT

A system for remotely opening a land vehicle door is provided. The system includes a mobile communication device supported on the vehicle and operative to produce a first signal in the form of a first electromagnetic field defined by a field envelope. A hand-held communication device is operative to detect the first electromagnetic field and produce a second signal in the form of a second electromagnetic field when the hand-held device is located within the field envelope. Control logic is coupled to the mobile device and is operative to determine if the hand-held device is an authorized hand-held device. The control logic is operative to determine if a pedestrian carrying an authorized handheld device is located within the field envelope and to generate a door-opening command signal when the authorized device is located within the field envelope for a predetermined period of time.

18 Claims, 6 Drawing Sheets

Related U.S. Application Data a continuation-in-part of application No. 15/045,859, filed on Feb. 17, 2016.

(56) References Cited

U.S. PATENT DOCUMENTS

| | | | |
|---|---|---|---|
| 8,410,899 B2 | 4/2013 | Stevenson et al. | |
| 8,788,152 B2 | 7/2014 | Reimann et al. | |
| 8,849,605 B2 | 9/2014 | Lakhzouri et al. | |
| 9,162,685 B2 | 10/2015 | Schindler et al. | |
| 9,199,608 B2 | 12/2015 | Newman et al. | |
| 2007/0200672 A1* | 8/2007 | McBride | B60R 25/245 340/5.72 |
| 2008/0106908 A1* | 5/2008 | Englander | B60Q 1/24 362/481 |
| 2009/0243796 A1* | 10/2009 | Tieman | B60R 25/24 340/5.72 |
| 2010/0171642 A1 | 7/2010 | Hassan et al. | |
| 2010/0305779 A1* | 12/2010 | Hassan | G01C 17/38 701/2 |
| 2011/0118946 A1* | 5/2011 | Reimann | B60R 25/2036 701/49 |
| 2011/0187492 A1 | 8/2011 | Newman et al. | |
| 2011/0313619 A1 | 12/2011 | Washeleski et al. | |
| 2012/0249291 A1 | 10/2012 | Holcomb et al. | |
| 2013/0311039 A1 | 11/2013 | Washeleski et al. | |
| 2014/0207343 A1 | 7/2014 | Kigoshi et al. | |
| 2015/0021887 A1 | 1/2015 | Hiraiwa et al. | |
| 2015/0258962 A1* | 9/2015 | Khanu | B60R 25/2054 701/49 |
| 2015/0279131 A1 | 10/2015 | Nespolo | |
| 2015/0284984 A1 | 10/2015 | Kanter et al. | |
| 2015/0287257 A1 | 10/2015 | Thompson | |
| 2016/0001700 A1* | 1/2016 | Salter | B60Q 1/56 362/510 |
| 2016/0193957 A1* | 7/2016 | De Wind | B60Q 1/2619 362/23.12 |
| 2016/0225203 A1 | 8/2016 | Asmar et al. | |

OTHER PUBLICATIONS

Office Action; related U.S. Appl. No. 15/045,847; notification date Nov. 14, 2016.

Office Action, U.S. Appl. No. 15/045,859, filed Feb. 17, 2016, Notification Date: Jul. 6, 2017.

\* cited by examiner

SYSTEM FOR REMOTELY OPENING A LAND-VEHICLE DOOR

CROSS REFERENCE TO RELATED APPLICATIONS

This application is a continuation-in-part of U.S. patent application Ser. No. 15/045,859 entitled "SYSTEM FOR REMOTELY CONTROLLING THE POSITION OF A LAND VEHICLE DOOR WHEREIN HAND-HELD AND MOBILE COMMUNICATION DEVICES OF THE SYSTEM COMMUNICATE VIA INDUCTIVE COUPLING" filed Feb. 17, 2016, and U.S. patent application Ser. No. 15/045,847 entitled "SYSTEM INCLUDING A HAND-HELD COMMUNICATION DEVICE HAVING A MOTION SENSOR FOR REMOTELY CONTROLLING THE POSITION OF A DOOR OF A LAND VEHICLE AND KEY FOB FOR USE IN THE SYSTEM", also filed Feb. 17, 2016.

TECHNICAL FIELD

This invention generally relates to systems for remotely opening land-vehicle doors and, in particular, to such systems which include hand-held communication devices such as key fobs.

Overview

As described in the Wikipedia entry entitled "Remote Keyless System", the term remote keyless system (RKS), also called keyless entry or remote control locking, refers to a lock that uses an electronic remote control as a key which is activated by a hand-held device or automatically by proximity.

Widely used in land vehicles such as automobiles, an RKS performs the functions of a standard car key without physical contact to control access to the vehicle. When within a few yards of the car, pressing a button on the remote can lock and unlock the doors, and may perform other functions. A remote keyless system can include both a remote keyless entry system (RKE), which unlocks the doors, and a remote keyless ignition system (RKI), which starts the engine.

Keyless remotes contain a short-range radio transmitter, and must be within a certain range, usually 5-20 meters, of the car to work. When a button is pushed, it sends a coded signal by radio waves to a receiver unit in the car, which locks or unlocks the door. Most RKEs operate at a frequency of 315 MHz for North America-made cars and at 433.92 MHz for European, Japanese and Asian cars. Modern systems implement encryption to prevent car thieves from intercepting and spoofing the signal. Earlier systems used infrared instead of radio frequent signals to unlock the vehicle.

The system may signal that it has either locked or unlocked the car usually through some fairly discreet combination of flashing vehicle lamps, a distinctive sound other than the horn, or some usage of the horn itself. A typical setup on cars is to have the horn or other sound chirp twice to signify that the car has been unlocked, and chirp once to indicate the car has been locked. Two beeps means that the driver's door is unlocked, four beeps means all doors are unlocked. One long beep is for the trunk or power tailgate. One short beep signifies that the car is locked and alarm is set.

Figure 2:
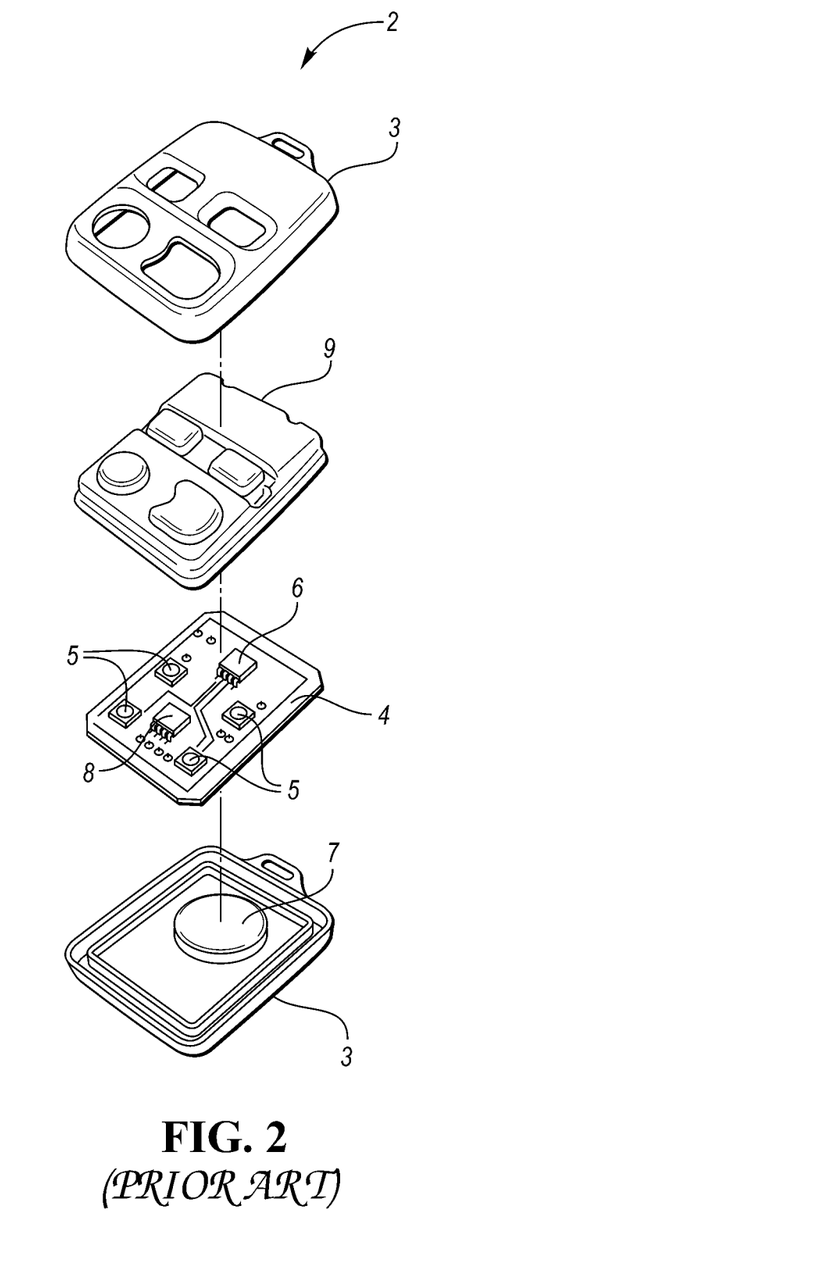
FIG. 2 is an exploded perspective view of a prior art key fob.

The functions of a remote keyless entry system are often contained on the remote or key fob (i.e. or just "fob") or built into the ignition key handle itself. FIG. 2 is an exploded perspective view of a prior art key fob, generally indicated at 2, having upper and lower housing parts 3, a one-piece plastic protective covering 9, a loop antenna 4, a plurality of push buttons 5, an RF transmitter 6, a battery 7 and a semiconductor device 8 which typically stores (in memory) or generates identification data which identifies the particular key fob 2. When an RF signal is transmitted or emitted from the antenna 4 of the transmitter 6, the signal contains the identification data. In turn, a mobile communication device (not shown) including a receiver having an antenna is supported on the vehicle receives the signal and removes or extracts the identification data from the RF signal to determine if the key fob 2 is an authorized key fob.

The buttons 5 are dedicated to locking or unlocking the doors and opening the trunk or tailgate. On some minivans the power sliding doors can be opened/closed remotely. Some cars will also close any open windows and roof when remotely locking the car. Some remotes or key fobs also feature a panic button which activates the car alarm as a standard feature. Further adding to the convenience, some cars' engines with remote keyless ignition systems can be started by the push of one of the buttons 5 on the key fob 2, and convertible tops can be raised and lowered from the outside the vehicle while it's parked.

On cars where the trunk release is electronically operated, it can be triggered to open by one of the buttons on the remote 2. Conventionally, the trunk springs open with the help of hydraulic struts or torsion springs, and thereafter must be lowered manually. Premium models, such as SUVs and vehicles with tailgates, may have a motorized assist that can both open and close the tailgate for easy access and remote operation.

Some cars have a proximity system that is triggered if a keylike transducer is within a certain distance of the car. Such systems are sometimes called hands-free or advanced key. With such a smart key system, a vehicle can be unlocked without the driver needing to physically push a button on the key fob to lock or unlock the car and is also able to start or stop the ignition without physically having to insert the key and turning the ignition. Instead, the vehicle senses that the key (located in a pocket, purse, etc.) is approaching the vehicle. When the key fob is within the car's required "bubble" distance (i.e., the required distance or range from the vehicle for the key to be recognized), there are two methods typically used by auto manufacturers to unlock the doors;

the car will automatically unlock the driver's door; and
the car doesn't unlock the door unless the keyholder touches one of the sensors located behind the door handles.

In certain vehicles there are also various functions built into the transmitter to perform various tasks. For instance, pressing the unlock button twice and keeping the button depressed on the second push allows the keyholder to roll down certain pre-programmed windows and/or the sunroof. Other functions range from turning on the headlights and various electronic equipment (factory or aftermarket). On some vehicles, the system prevents the driver or passenger from accidentally locking the keys in the car, via a sensor that detects whether the keyholder is within the "bubble" area outside the vehicle.

For purposes of this application, the term "vehicle door" is used to describe a hinged or sliding barrier in front of a vehicle opening which can be opened to provide access to the opening or closed to secure the opening. The term "vehicle door" includes but is not limited to, liftgates, tailgates and trunk lids.

For purposes of this application the term "transceiver" (i.e. transmitter/receiver) refers to a device that performs, with a single, common housing, package or structure (such as a chassis or chip), both transmitting and receiving functions, preferably using common circuit components for both transmitting and receiving.

For purposes of this application "multi-modal" refers to operability using different protocols, which may include one or more of different modulation schemes, different frequencies and different standards.

As used herein, the term "sensor" is used to describe a circuit or assembly that includes a sensing element and other components. In particular, as used herein, the term "motion sensor" is used to describe a circuit or assembly that includes a motion sensing element and electronics coupled to the motion sensing element. Motion sensors can be, but are not limited to, inertial sensors.

As used herein, the term "step motion" is used to describe pedestrian motions, such as walking, running, and stepping, as well as standing still (i.e., substantially no pedestrian motion).

As used herein, the term "motion sensing element" is used to describe a variety of electronic elements that can sense a motion. The motion sensing elements can be, but are not limited to, multi-axis accelerometers and/or gyroscopes.

For purposes of this application, "protocol" refers to a set of conventions governing the format and control of interaction among communicating functional units and, in general, permitting devices and information systems to exchange data or information. Protocol may include semantic and syntactic rules that determine the behavior of entities in performing communication functions. Protocols may govern portions of a network, types of service, or administrative procedures. For example, a data link protocol is the specification of methods whereby data communications over a data link are performed in terms of the particular transmission mode, control procedures, and recover procedures. Protocols include the specific modulation formats and frequencies associated with the modulation formats.

Related U.S. patent documents include: U.S. Pat. Nos. 6,571,193; 7,202,775; 8,410,899, 8,788,152; 9,162,685; 2012/0249291; 2015/0021887; 2015/0258962; 2015/0279131; and 2015/0284984.

As described in 2015/0287257, smart phone applications have been developed to give smart phones the functionality of a key fob. For example, a smart phone with the appropriate software application or computer program(s) can be used in place of an electronic key fob to lock and unlock doors, control a car find feature (audible horn honk), start a vehicle remotely, or program auxiliary outputs (like trunk release). However, the wireless communication between the phone and the car generally occurs over a cellular network, thereby introducing latency between command and response time, as well as an increase in cost.

In view of the above, it is known to provide a powered tailgate on motor vehicles to facilitate access to the vehicle. The powered tailgate can, for example, be activated by pressing a button on a key fob. However, a potential problem arises if the user is carrying a small child and/or objects, such as boxes, luggage, shopping bags, coolers, etc., with both hands and cannot readily access the key fob without setting one or more objects down.

Figure 1:
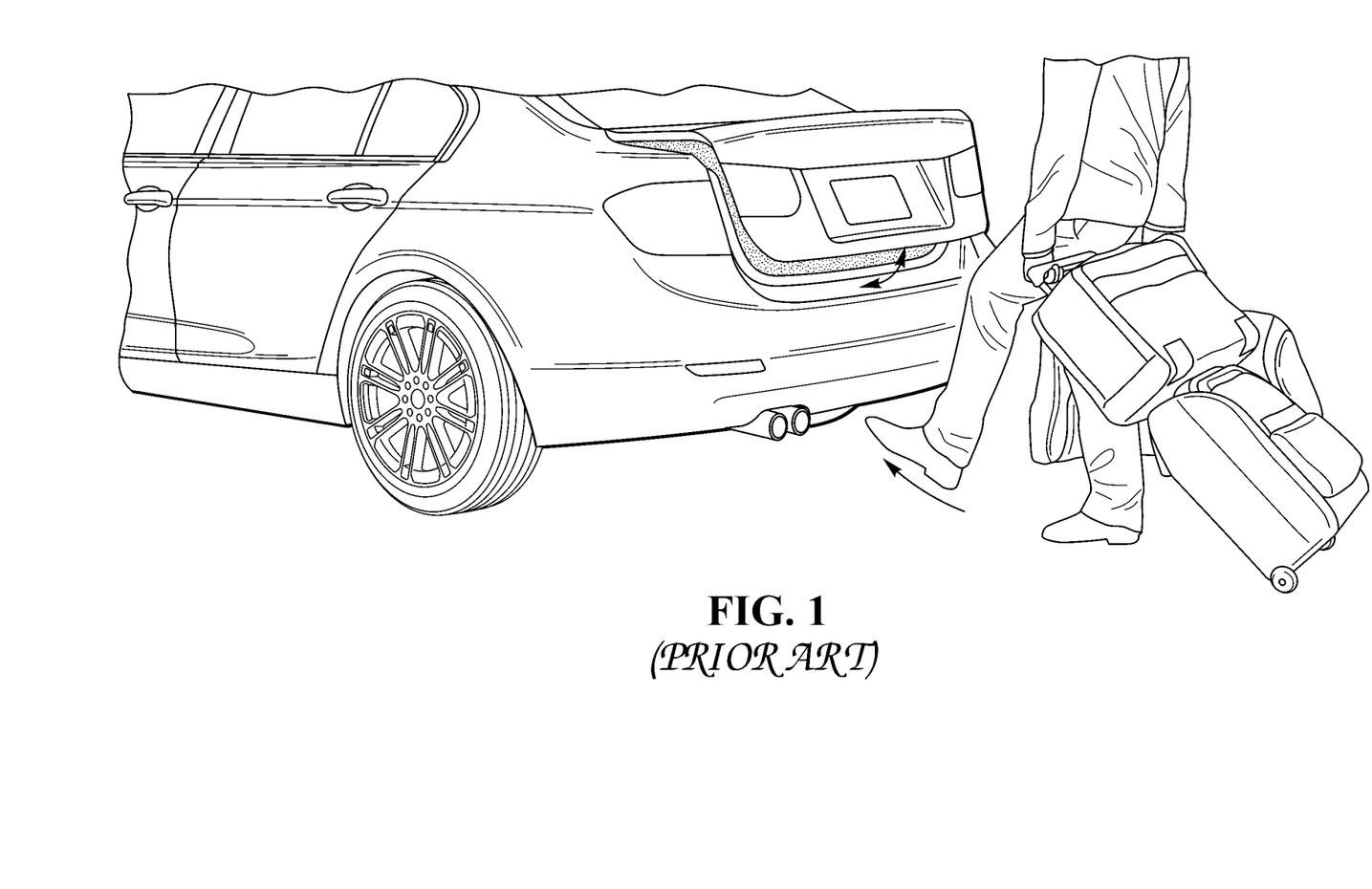
FIG. 1 is a schematic view, partially broken away, of a land vehicle and a pedestrian gesturing with his leg under a tail apron of the vehicle wherein the trunk door or lid is in the process of opening.

At least one prior art document discloses a capacitive sensor arrangement mounted to a tail apron of a vehicle. The capacitor sensor arrangement is configured to detect a gesture in the form of swiveling action or kick of the user's foot under the tail apron and the system recognizes the remote entry key or the user. Upon detection of the swiveling action, the vehicle tailgate is automatically opened. As shown in FIG. 1, however, the required gesture to open the tailgate is not intuitive and could cause the user to become unbalanced, especially if the surface adjacent the vehicle is slippery. Disabled and elderly persons may also find it difficult to press the desired button on the key fob or to make the required foot gesture. Another potential problem is that such capacitive sensors may get covered by snow, ice and/or dirt.

As previously mentioned, remote keyless entry fobs are generally used to remotely lock and unlock vehicle doors. As an example, a fob may have one or more buttons, a battery and a transmitter. Upon pushing one of the buttons, the transmitter sends a signal to a vehicle equipped with a receiver, and the receiver subsequently causes the vehicle door to unlock. One issue with such a system is that many vehicles now have multiple functions which may be controlled by the remote fob. Examples of such functions include power sliding doors, sun roofs, alarm systems, trunks, lift gages, and the vehicle doors. Implementing the increased functionality with a button-based fob causes the battery of the fob to quickly drain. Insufficient battery life is a problem which will only get larger as new functions are inevitably added to the fob.

SUMMARY OF EXAMPLE EMBODIMENT

An object of at least one embodiment of the present invention is to provide a system for remotely opening a land-vehicle door using an authorized hand-held communication device such as a key fob when located at a predetermined location adjacent the vehicle for a predetermined period of time.

In carrying out the above object and other objects of at least one embodiment of the present invention, a system for remotely opening a land vehicle door is provided. The door moves through a volume of space defined by an opening envelope when the door moves from its closed position to its open position. The system includes a mobile communication device supported on the vehicle for movement therewith and operative to produce a first signal in the form of a first electromagnetic field over a volume of space outside and adjacent the vehicle and defined by a field envelope. The system also includes a hand-held communication device operative to detect the first electromagnetic field and produce a second signal in the form of a second electromagnetic field when the hand-held device is located within the field envelope. The mobile device is operative to remove identification data from the second signal. The identification data identifies the hand-held device. The system further includes control logic coupled to the mobile device. The control logic is operative to determine if the hand-held device is an authorized hand-held device based on the identification data. The control logic is operative to determine if a pedestrian carrying an authorized hand-held device is located within the field envelope and to generate a door-opening command signal when the authorized device is located within the field envelope for a predetermined period of time.

The mobile device may be supported on the vehicle so that the opening envelope is in non-overlapping relationship to the field envelope.

The system may further include a source of light supported on the vehicle to illuminate an area outside and adjacent to the vehicle for viewing by a pedestrian carrying an authorized hand-held device to identify a location where the pedestrian can safely stand during opening of the door.

The source of light may illuminate a ground surface adjacent to the vehicle.

The opening envelope may be a non-overlapping relationship with the illuminated area.

The door may be a gull-wing door.

The door may be a tailgate.

The hand-held device may be a key fob.

The source of light may be supported within a housing of a tail-light assembly of the vehicle.

The system may further include a source of sound supported on the vehicle to emit sound which can be heard outside and adjacent to the vehicle to warn a pedestrian carrying an authorized hand-held device to stay out of the opening envelope.

The hand-held device may include a motion sensor operative to provide a motion signal as a function of lack of motion of a pedestrian carrying the hand-held device within the field envelope for the predetermined period of time.

Further in carrying out the above object and other objects of at least one embodiment of the present invention, a system for remotely opening a land vehicle door which moves through a volume of space defined by an opening envelope when the door moves from its closed position to its open position is provided. The system includes a mobile communication device supported on the vehicle for movement therewith and operative to produce a first signal in the form of a first electromagnetic field over a volume of space outside and adjacent the vehicle and defined by a field envelope. The system also includes a hand-held communication device operative to detect the first electromagnetic field and produce a second signal in the form of a second electromagnetic field when the hand-held device is located within the field envelope. The mobile device is operative to remove identification data from the second signal. The identification data identifies the hand-held device. The system further includes a source of light supported on the vehicle to illuminate an area outside and adjacent to the vehicle for viewing by a pedestrian carrying an authorized hand-held device to identify a location where the pedestrian can safely stand during opening of the door. The system still further includes control logic coupled to the mobile device and being operative to determine if the hand-held device is an authorized hand-held device based on the identification data. The control logic is operative to determine if a pedestrian carrying an authorized hand-held device is located within the field envelope and to generate a door-opening command signal when the authorized device is located within the field envelope.

The mobile device may be supported on the vehicle so that the opening envelope is in non-overlapping relationship to the field envelope.

The source of light may illuminate a ground surface adjacent to the vehicle.

The opening envelope may be in non-overlapping relationship with the illuminated area.

The door may be a gull-wing door.

The door may be a tailgate.

The hand-held device may be a key fob.

The source of light may be supported within a housing of a tail-light assembly of the vehicle.

The system may further include a source of sound supported on the vehicle to emit sound which can be heard outside and adjacent to the vehicle to warn a pedestrian carrying an authorized hand-held device to stay out of the opening envelope.

The hand-held device may include a motion sensor operative to provide a motion signal as a function of lack of motion of a pedestrian carrying the hand-held device within the field envelope for a predetermined period of time.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 3:
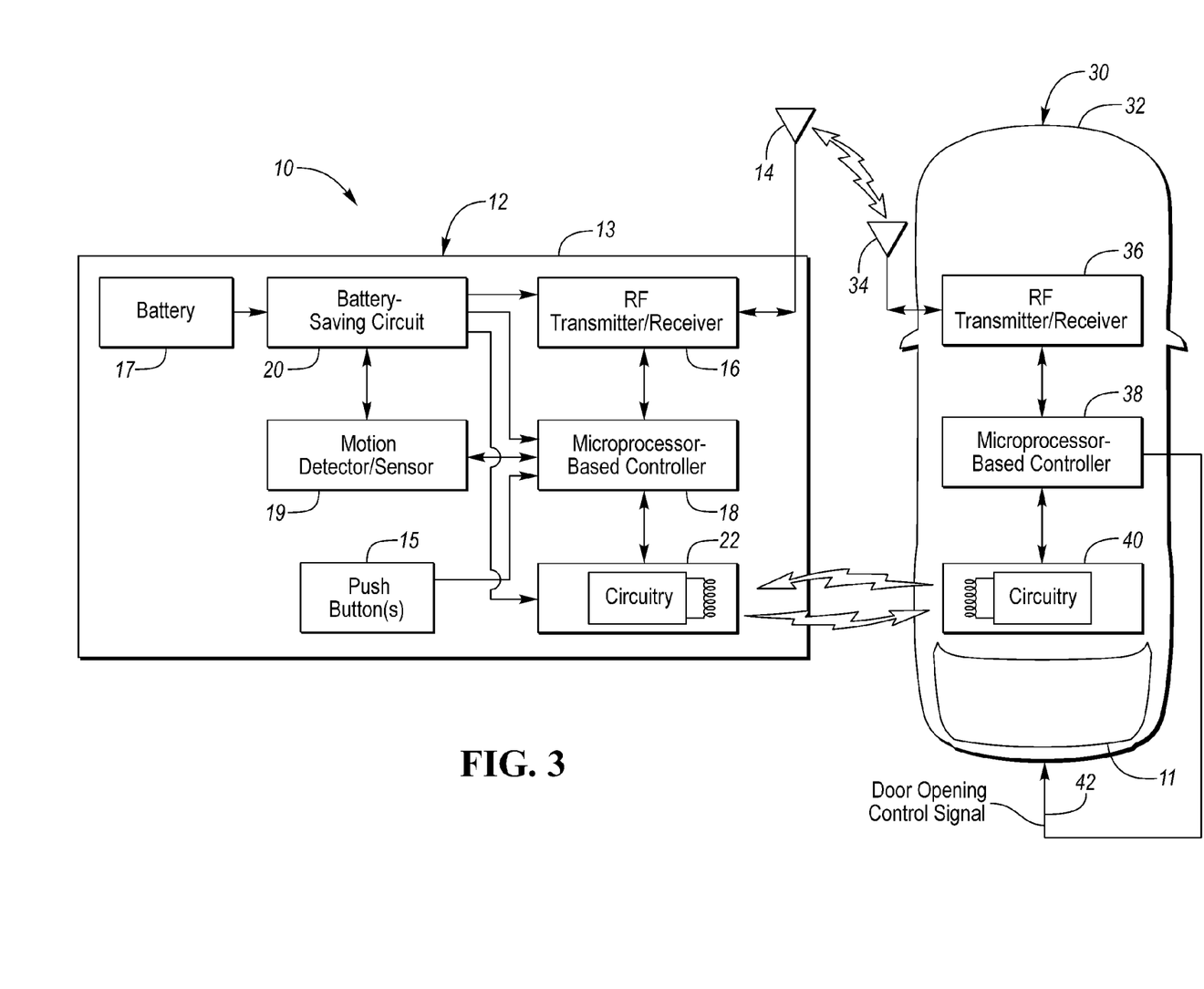
FIG. 3 is a block diagram of at least one embodiment of the present invention, including a mobile communication device supported on the vehicle and a hand-held communication device such as a key fob for remotely opening the trunk door or lid (i.e. vehicle door)
Figures 7, 8:
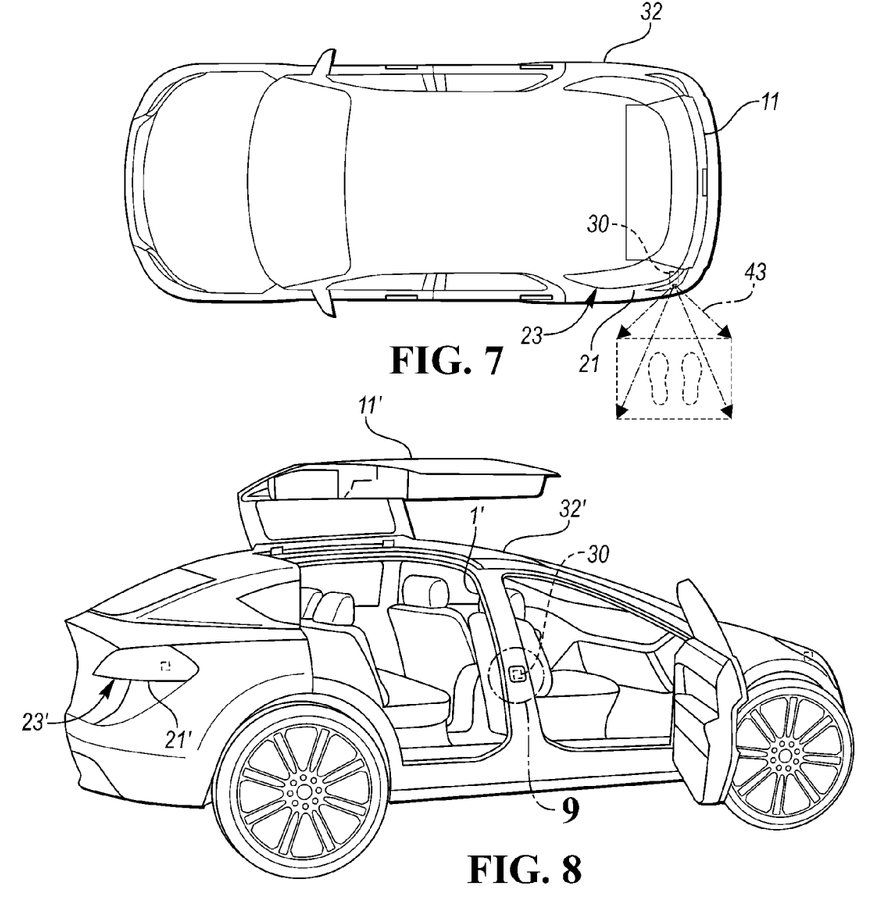
FIG. 7 is a top plan view of the vehicle and the mobile device within the taillight assembly of the vehicle wherein a "safe" location where a pedestrian can stand outside of the opening envelope of the vehicle door is indicated by phantom footprints within a lighted area.
FIG. 8 is a perspective view of a vehicle having a gull-wing door which also has an opening envelope wherein the mobile device is located in a side pillar of the vehicle.
Figure 9:
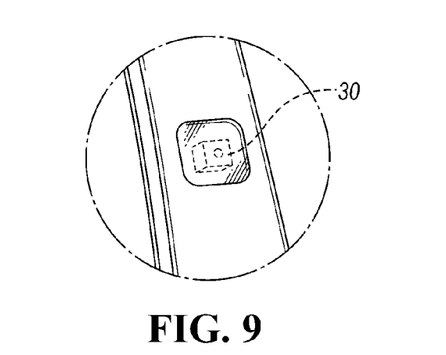
FIG. 9 is an enlarged view of the area within the phantom circle 9 of FIG. 8 and further illustrating the mobile device.

Referring now to FIGS. 3 and 8, a system, generally indicated at 10, is provided for remotely opening a land vehicle door (disclosed in FIG. 1 as a trunk lid 11 but may comprise a tailgate or a gull-wing door 11' of vehicle 32' of FIG. 8). The door 11 (or door 11') is capable of moving through a volume of space defined by an opening envelope between a closed position in which the door 11 covers a vehicle opening 1 (or opening 1'), such as a trunk opening, and an opened position in which the door 11 uncovers the opening 1 to provide access in the opening 1 or trunk of a vehicle 32 (or vehicle 32').

Figure 5:
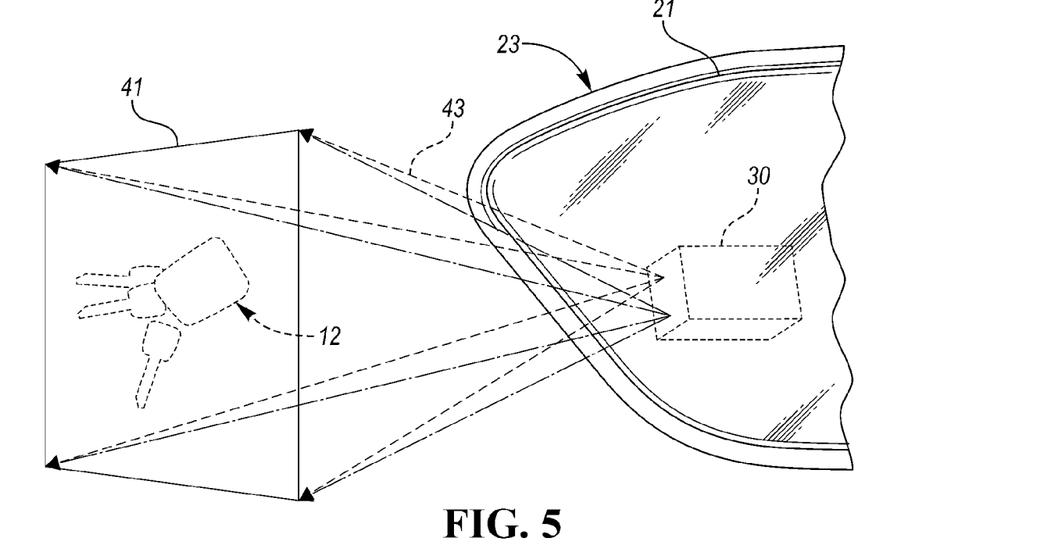
FIG. 5 is an enlarged view of the area with the phantom circle 5 of FIG. 4 and partially broken away wherein a first signal in the form of a first electromagnetic field over a volume of space outside and adjacent the vehicle is defined by a field envelope indicated by solid lines and a light field, also produced by the mobile device, is coincident with the electromagnetic field so that the pedestrian can see where the electromagnetic field is located so that the pedestrian can see where to stand so that the hand-held device is located within the electromagnetic field.
Figure 6:
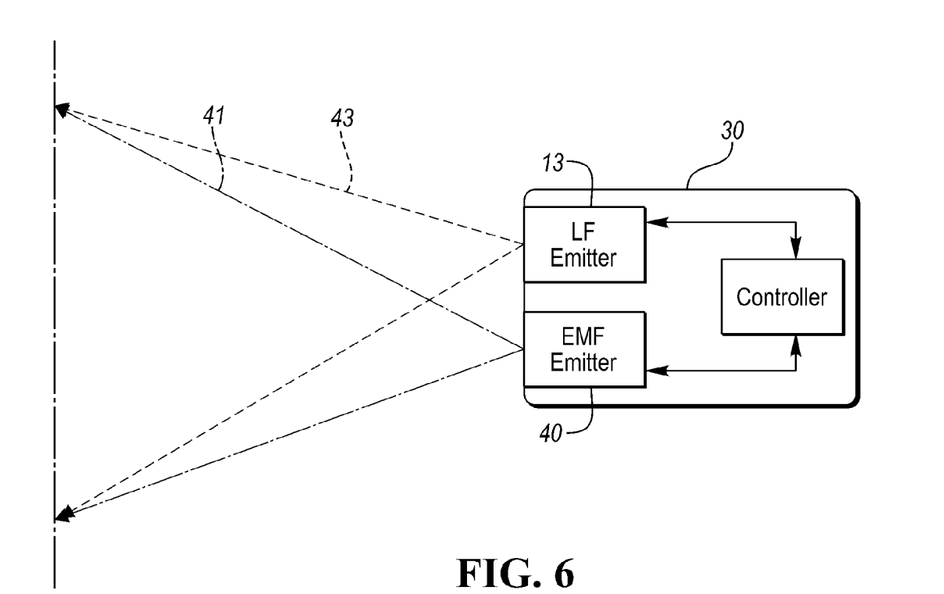
FIG. 6 is a schematic block diagram view of the light field (LF) and electromagnetic (EM) emitters and a common controller (i.e. control logic) of the mobile device.

The system 10 includes a mobile communication device, generally indicated at 30, supported on the vehicle 32 for movement therewith. The device 30 includes circuitry 40 operative to produce an excitation signal in the form of a short-range, electromagnetic field within a first range of the device 30. The field extends over a volume of space outside and adjacent the vehicle and defined by an EM field envelope 41 (FIGS. 5 and 6). The mobile device 30 is supported on the vehicle 32 so that the opening envelope of the door 11 (or 11') is in non-overlapping relationship to the field envelope 41.

The system 10 also includes a hand-held communication device, generally indicated at 12, such as a key fob including circuitry 22 operative to produce a response signal in the form of a second, short-range, electromagnetic field when the device 12 is located within the first range or field envelope 41 of the device 30.

Figure 4:
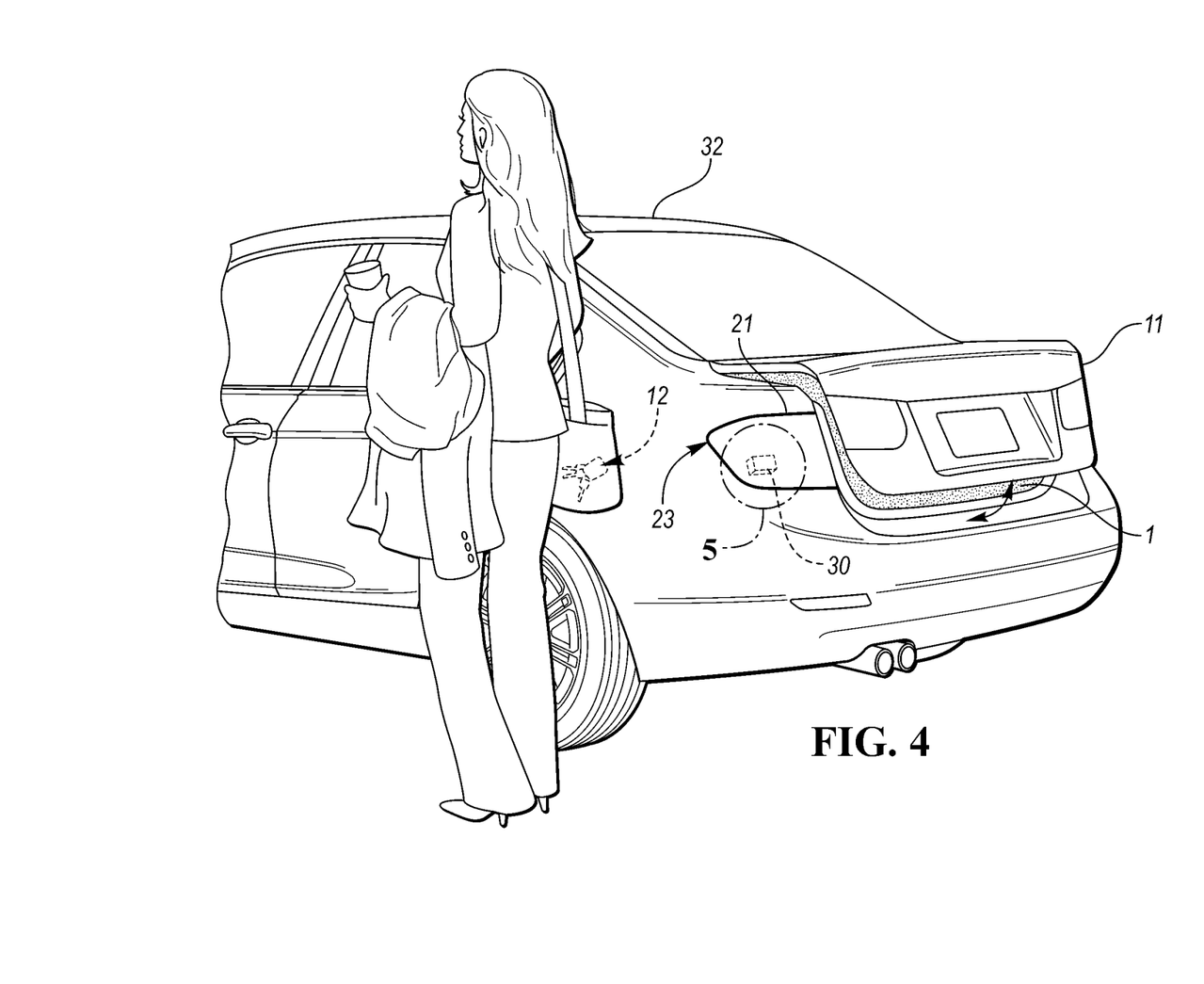
FIG. 4 is a schematic view, partially broken away, of a land vehicle and a pedestrian carrying an authorized hand-held device (in phantom) within a field envelope of a mobile communication device (also in phantom and located in a tail-light assembly) which has generated a door-opening command signal after the authorized device has been located within the field envelope for a predetermined period of time.

The device 12 also includes a motion sensor or detector 19 operative to provide motion signals to a microprocessor-based controller 18 as a function of motions made by a pedestrian carrying the hand-held device 12. The sensor 19 may provide a signal as a function of lack of motion (i.e. standing substantially still as shown in FIG. 4) of a pedestrian carrying the hand-held device 12 within the field envelope for a predetermined period of time (i.e. a few seconds).

The system 10 further includes control logic coupled to the devices 12 and 30. As described in detail herein below, the control logic is preferably implemented by software in one or both of the microprocessor-based controllers 18 and 38.

Each of the hand-held and mobile communication devices 12 and 30 is capable of wirelessly transmitting and receiving, respectively, RF command signals via transceivers 16 and 36 as long as the pedestrian carrying the hand-held device 12 is within a first range or field envelope 41 of the mobile device 30. Each of the command signals contains identification data which identifies the hand-held device 12 and command data which identifies a pedestrian command for the vehicle 32 to automatically perform an operation. The mobile device 30 is operative to remove the identification and command data from the command signals and the control logic is operative to determine if the hand-held device 12 is an authorized hand-held device 12 based on the identification data. The control logic is operative to generate a door opening command and control signal 42 (FIG. 3) for use by a door actuator (not shown) when the authorized device 12 is located within the field envelope 41 for a predetermined period of time.

The hand-held device 12 may include an energy storage device to supply stored electrical energy to the control logic and the motion sensor 19. The energy storage device may comprise a battery 17 which provide power via a battery saving circuit 20.

The device 30 may include a source of light or light-field (LF) emitter 13 supported within a housing 21 of a tail-light assembly, generally indicated at 23, of the vehicle 32. The light-field is defined by an envelope 43 (FIGS. 5, 6 and 7). The source of light 13 illuminates an area outside and adjacent to the vehicle 32 for viewing by a pedestrian carrying an authorized hand-held device 12 to identify a location where the pedestrian can safely stand outside the door's opening envelope during opening of the door 11 or 11'.

The source of light 13 may illuminate a ground surface adjacent the vehicle 32 (i.e. FIG. 7) or a location adjacent the source of light 13, near the housing 21. Typically, the opening envelope is in non-overlapping relationship with the illuminated area and the light envelope 43.

The mobile device 30 may include an RF receiver or transceiver 36 wherein the hand-held device 12 includes a transmitter or transceiver 16 to wirelessly transmit the command signals which are received by the receiver 36.

The hand-held device 12 may include a user interface 15 coupled to the control logic or controller 18 wherein the control logic 18 is operative to determine whether the pedestrian has activated the interface 15 to control the transmitter 16 to transmit one of the command signals. The user interface may include one or more push buttons 15 one of which is dedicated to opening the vehicle door 11 or 11'.

The system 10 may include a source of sound (not shown) such as a speaker supported on the vehicle 32 to emit sound which can be heard outside and adjacent to the vehicle 32 to warn a pedestrian carrying an authorized hand-held device 12 to stay out of the opening envelope.

The mobile device 30 may include the first transceiver 36 wherein the hand-held device 12 includes the second transceiver 16 that communicates with the first transceiver 36 via two-way communication. The control logic within the controller 38 may monitor the position of the hand-held device 12 with respect to the mobile device 30 based on data received from the second transceiver 16.

The hand-held device 12 can be any hand-held device with a wireless interface, such as a laptop computer, a tablet device, a key fob, a car key, an access card, a mobile phone, a portable gaming device, a portable multimedia player, a portable music player, a personal digital assistant (PDA), any hand-held electronic or electro-mechanical device. For example, such a hand-held device can be an iPod®, iPhone®, or iPad® device available from Apple Inc. of Cupertino, Calif. In one embodiment, the fob 12 includes the motion sensor 19 for sensing motion of a pedestrian carrying the fob 12. The motions of the pedestrian may be interpreted by the microcontroller 18 or a digital signal processor, which executes instructions according to a predetermined program. An antenna 14 may be located internal or external to the fob housing 13.

Some personal, hand-held electronic devices 12, such as some mobile phones, have implemented MEMS inertial sensors. For example, the Nokia 5500 sports phone uses an embedded 3-axis MEMS inertial sensor to detect the steps a user takes. The step counter or pedometer software application within the Nokia 5500 then tracks the steps taken, time lapsed and distanced traveled (once a standardized step distance has been entered).

The vehicle 32 typically has several functions that may be controlled by the fob 12. By way of non-limiting example, the vehicle 32 may have controlled an opening hood, a front door, a rearward hinged or sliding door, a gull-wing door (FIG. 8), a trunk or lift gate (FIG. 4), head lamps, tail lamps, and an alarm tone.

The land vehicle 32 can be any suitable transportation machinery, such as an automobile, a truck, a bus, a train, a tractor, a golf cart, a go-kart, a motorcycle, a scooter, a motorized bicycle, a lawn mower, a snowmobile, a remote controlled device (e.g., remote controlled car), and/or the like.

The microcontroller 18 determines when a command control signal should be transmitted to the vehicle 32. The vehicle antenna 34 receives the command signal and sends it to the receiver 36 for processing. The controller 38 then causes action to be taken in correspondence with the received command signal, such as emitting a door opening command signal along a wire or vehicle bus 42. For example, if the fob 12 determines that the fob user would like to open the trunk lid, then the fob 12 sends a command signal corresponding to a trunk opening function. The vehicle 32 will receive and process the command signal via the antenna 34 and the receiver 36, and affect the opening of the trunk lid. Similarly, the fob 12 and the device 30 may work together to operate the other functions of the vehicle 32.

The controller 18 receives sensor data or signals from the motion sensor 19. Once received from the motion sensor 19, the transmitter 16 retransmits the data or signals in analog form or, alternatively, in digitally encoded form with the digital encoding taking place in the controller 38. In such an embodiment, the vehicle 32 is equipped with the microprocessor-based controller 38 for receiving, recognizing, and effecting action based upon the commands. Such an arrangement allows the fob 12 to be used regardless of the vehicle's option contents. If the vehicle 32 is equipped with a transmitter, such as transceiver 36, then the fob 12 may be equipped with the transceiver 16 for receiving signals from the vehicle 32 in addition to transmitting signals to the vehicle 32.

Although not explicitly illustrated, one of ordinary skill in the art will recognize that one or more of the illustrated steps or functions may be repeatedly performed depending upon the particular application and processing strategy being used. Preferably, the control logic is implemented primarily in software executed by the microprocessor-based controller 18 and/or the controller 38. Of course, the control logic may be implemented in software, hardware, or a combination of software and hardware depending upon the particular application. When implemented in software, the control logic is preferably provided in a computer-readable storage medium having stored data representing instructions executed by a computer. The computer-readable storage medium or media may be any of a number of known physical devices which utilize electric, magnetic, and/or optical devices to temporarily or persistently store executable instructions and associated calibration information, operating variables, and the like. For example, the computer-readable storage media may include volatile and nonvolatile storage in read-only (ROM), random-access memory (RAM), and keep-alive memory (KAM). For example, KAM may be used to store various operating variables. The computer-readable storage media may be implemented using any of a number of known memory devices such as PROMs (programmable read-only memory), EPROMs (electrically PROM), EEPROMs (electrically erasable PROM) and/or flash memory.

The system 10 of at least one embodiment of the invention may comprise the generally hand-held communication device such as the key fob 12 and control logic which controls communication between the fob 12 and the receiver 36. The fob 12 is generally hand-held by users or pedestrians and/or is carried within objects, such as pockets and purses. The fob 12 is generally operable to communicate identification information or data to the device 30.

Fobs, such as the fob 12, may serve different functions and be associated with either users or objects. As shown in FIG. 3, the fob 12 and the receiver 36 generally each include a transmitter, a receiver, a combination transmitter and receiver (i.e. a transceiver), a transponder or other receiving or transmitting mechanisms suitable for communicating identification and/or command information between the fob 12 and the receiver 36.

The power source for the fob 12 may, in many embodiments, include the battery 17 or other such energy storage element. In some embodiments, additional power source elements may be present. For example, the fob 12 may include capacitive or inductive-based vibratory energy converters for generating energy from kinetic energy. Such a converter may be used to supply a trickle charge for recharging the battery 17 when the fob 12 is in motion. In other embodiments, the fob 12 may include solar or other energy converters for harvesting energy and charging the battery 17. The fob 12 may also or alternatively be equipped with a recharging port to permit connection to a recharger.

The fob 12 may also include the battery-saving circuit 20 coupled to the battery 17, the sensor 19, the controller 18 and the transmitter 16 to provide power from the battery 17 when the fob 12 is "awake", such as when the sensor 19 detects that the fob 12 is in motion. Otherwise, when the fob 12 is not "awake" a lower level of current may be provided.

For purposes of unidirectional and bidirectional communication of data or other signaling between the fob 12 and the device 30, several formats/protocols exist, and may be utilized. The system may utilize fobs using different technologies or fobs combining different technologies. For example, as further discussed below, near field communication ("NFC") technology has the benefit of consuming less power than other technologies and its short range becomes problematic when attempting to locate pedestrians or objects that are not within close proximity to an NFC receiver. Therefore, fobs combining technologies, such as low-power/high-power RF and NFC, may be helpful in a given system 10.

The fob 12 may include a database (i.e. within the controller 18) to store tracking processes, fob specific event data or non-tracking process subject data. Event data includes the fob's location and switch state's history. Subject data includes data or pointers to data (information needed to retrieve the data from another source) such as name or record number pertinent to each fob's subject.

One or more fobs having a unique ID are typically provided for each vehicle. The fobs also typically include one or more inertial sensors such as accelerometers to sense the movement or orientation of the fobs. The accelerometers may provide input or feedback regarding the movement of the fob, and, thus, the pedestrian user or object with which it is associated. By way of example, the accelerometers may include a 3-axis accelerometer.

As previously mentioned, the fob 12 may communicate with the device 30 in a bi-directional fashion. The fob 12 may be programmed with data, and may communicate data. As detailed below, the fob 12 can utilize near-field communication (NFC) technology. An NFC fob can be programmed with the data by abutting the fob to another NFC device on the mobile device 30 which is operable to exchange information with the other NFC fobs.

The fob 12 may include a sensor to receive information from the device 30 and may be configured to transmit information based upon the input from the device 30. The fob 12 or its receiver 16 may be designed to sense a particular environment, such as a RF signal from the device 30 in the radio frequency range.

The fob 12 (as well as the device 30) of at least one embodiment of the present invention may include elements generally found in many communication devices, whether individually or part of an integrated circuit or microcontroller, and including elements integrated into a single chip. As previously mentioned, these elements may include a battery, antenna interfaces, antenna(s), modulators, demodulators, transceivers, duplexers, RF switches, filter, I/Os, UARTs, interrupts, memory, modems and the like, and the code to operate the device elements.

The fob 12 may further include an RF receiver as part of a transceiver 16 that is operable to receive a signal from the transceiver 36 of the device 30 via the antenna 34. The fob 12 may be operable to activate either a visual, audible or tactile alert indicator in response to receiving the signal from the transceiver 36.

The RF signal transmitted from the fob's antenna 14 may be modulated to represent each fob's unique ID number. Each vehicle's identification data is associated with each unique fob number. This provision allows the control logic of the controller 38 to associate unique fob data with the particular vehicle.

The fob 12 may transmit a radio frequency (i.e. RF) signal via the antenna 14, containing a data packet with at least the unique fob ID, in a substantially spherical pattern. The radio frequency signals emitted by the antenna 14 are received by the antenna 34 of the receiver 36 of the device 30 having a predetermined range in all directions. The radio frequency receiver 36 converts encoded signals emitted by the fob 12 into electrical signals or data and transmits them to the controller 38 for processing and then via the network or bus 42 of the vehicle 32 to an actuator (not shown) for opening the vehicle door.

The RF signal sent via the antenna 34 may contain a data packet with ID data space providing a number of unique fob IDs. Additionally, the RF data packet may generate error checking data and fob qualifier data (e.g. battery state, motion state, etc.) as an optional prefix and/or optional suffix to the unique fob ID.

Radio Frequency Identification

In the system 10, the signaling fob 12 can be designed to utilize Radio Frequency Identification (RFID) for identifying users and objects.

In one embodiment, the fob 12 contains a microchip, the microprocessor-based controller 18, and the RF transmitter 16 including the antenna 14 which operates at a certain frequency, stores a specific ID and other user or object-related data, and sends the data to the receiver 36 of the device 30 at certain times or upon request.

The RF transmitter 16 of the fob 12 may be passive or active, according to the fob's power source. A passive fob will be activated by the electromagnetic energy emitted by the device 30. Such a passive fob 12 depends on the device 30 for power to operate and, consequently, has a shorter read ranges and smaller data storage capacity range than a comparable active fob. An active fob, such as the fob 12, relies on one or more internal batteries for power supply, which enhances the read ranges range significantly and enables additional on-board memory and local sensing and processing capacities. However, the onboard power source or battery 17 increases the cost of the fobs and limits the operating time of the fobs. To bridge the gap between passive and active fobs, a third type of fob, battery-assisted passive fob or semi-passive fob, utilizes on-board batteries to power the fobs but which are only activated when in the range of, and requested by, the device 30.

The device 30 comprises the antenna 34 and the transceiver 36, and reads data from, and writes data to the fob 12. The antenna 34 establishes the communication between the fob 12 and the transceiver 36, and its shape and dimensions determine the performance characteristics such as the frequency range. Larger antenna loops tend to yield wider coverage areas, but the signal-to-noise ratio decreases at the same time.

The frequency on which the system 10 operates is another important element, which determines the characteristics of the signals traveling between the devices 12 and 30. Available frequencies include low frequency (LF), high frequency (HF), and ultra-high frequency (UHF). Super-high frequency (SHF) or microwave may also be used. UHF passive fobs offer simple and inexpensive solutions. Active fobs typically operate on UHF.

The fob 12 can be read-only or read/write; the latter enables data entry directly to the fob 12. The device 30, which sends RF signals for communication, may be used to read data from the fob 12. RFID technology does not require line-of-sight, and also it is durable to harsh environments and can be embedded in the vehicle. Reading range depends on the frequency at which the fob operates, and it varies from several inches up to many feet. RFID enables efficient automatic data collection because multiple receivers can be mounted on the vehicle 32 to detect and read fobs in the reading range and each receiver can scan multiple fobs at a given time. This technology can report the radius inside which the pedestrian is located.

Combinations of GPS and RFID technologies are also possible. Every time a fob is located, the 3D coordinates (as reported by the GPS) can be recorded as the location of the pedestrian at that given time.

An RFID system may include triangulation algorithms or algorithms based upon time-of-arrival of time-differences of arrival to calculate the location of the fob 12 using information from the devices 30. Control logic within the controller 38 receives the information from the receivers 36, through any intermediate devices, and uses triangulation algorithms to calculate the location of the fob 12. The information from the receivers 36 can be subjected to intermediate processing prior to receipt of the processed information by the control logic. The identification of the fob 12 can be used to identify the user associated with the fob 12 and such information can be stored, displayed or otherwise processed including any combinations thereof by the control logic. The algorithm may use distance estimates such as signal strength (RSSI) or time of arrival (TDOA).

Ultra Wideband

The signaling fob 12 can be designed to utilize Ultra Wideband (UWB) as another type of short-range communication radio technology. The fob 12 may be the same typically active RFID fob as described above in conjunction with an RFID system, but which periodically transmits short and low-power UWB bandwidth pulse signals. UWB systems can be made to accurately locate a fob in three dimensions despite signal attenuation and multiple signal pathways. UWB is able to provide 2- and 3-D localization even in the presence of severe multipath by detecting time-of-flight of the radio transmissions at various frequencies. Another advance of the UWB system is the low average power requirement that results from low pulse rate.

Generally, the system 10 associates pedestrians with a radio frequency fob 12 capable of emitting, preferably on an intermittent basis, UWB signals which signals include information identifying the fobs. The one or more signals are received by UWB devices 30 which are at one or more known locations on the vehicle 32. Increasing the number of receivers, increases the accuracy of the fob's location. The method may also include communicating at least fob identification information and one or more of time-of-arrival information and angle-of-arrival information from the UWB receivers to the control logic.

A UWB device 30 includes an RF sensor or receiver 36 which receives the UWB signals emitted by the fob 12 and communicate information to a device 30 for further routing or processing. Other information may comprise the UWB fob identification, time-of-arrival, angle of arrival, any available environmental condition information, and combinations of them. Such communication may be wired or wireless and may be routed through intermediate devices.

A UWB signal is preferably pulsed every second or every two seconds, and the pulse rate is designed based upon the desired battery life of the key fob 12, and the need to track movement direction and rate of pedestrians or objects.

Near-Field Communication

The signaling fob 12 can be designed to utilize Near-field communication (NFC) technology. NFC is a standards-based, short-range wireless connectivity technology that enables simple and intuitive two-way interaction between electronic devices. NFC technology permits contactless transactions, and simplifies setup of some longer-range wireless technologies, such as Bluetooth and Wi-Fi. It is also compatible with the global contactless standards. By design, NFC requires close proximity and it offers instant connectivity. NFC uses magnetic induction or inductive coupling between two loop antennas located within each other's near field, effectively forming an air-core transformer. Theoretical working distance with compact standard antennas: up to 20 cm (practical working distance of about 4 centimeters).

There are two modes: Passive communication mode and Active communication mode. In the former mode, the initiator device provides carrier fields and the target device answers by modulating the existing field. In this mode, the target device may draw its operating power from the initiator-provided electromagnetic field, thus making the target device a transponder. NFC involves an initiator and a target; the initiator actively generates an RF field that can power a passive target. This enables NFC targets to take very simple form factors such as key fobs that do not require batteries. NFC peer-to-peer communication is possible, where both devices are powered. In the active communication mode, both initiator and target device communicate by alternatively generating their own fields. A device deactivates its RF field while it is waiting for data. In this mode, both devices 12 and 30 typically have power supplies.

The NFC fob 12 contains data and is typically read-only but may be rewriteable. The fob 12 can be custom-encoded or use the specifications provided by the NFC Forum, an industry association charged with promoting the technology and setting key standards. The fobs can securely store personal data among other information. NFC devices are able to receive and transmit data at the same time. Thus, they can check for potential collisions if the received signal frequency does not match with the transmitted signal's frequency NFC operates at slower speeds than Bluetooth, but consumes less power and doesn't require pairing.

NFC provides a low-power wireless interaction tracking and detection circuit that triggers a higher-power communication system that can transfer more meaningful data after an interaction event has been detected. The NFC fobs are carried by users. The NFC fobs transmit a beacon signal using a short range wireless communication format received by another NFC device when the NFC devices are within physical proximity of each other. NFC devices may exchange short bits of information between themselves, receivers or other devices.

The NFC device 12 may continuously transmit signals on a predetermined time cycle, and these signals are received by NFC receivers positioned through the vehicle 32. Alternatively, the NFC devices transmit signals in a random, ad-hoc or dynamic manner, and these signals are received by the receivers positioned through the vehicle 32. The receivers 36 transmit the data within the NFC devices to the control logic.

As previously mentioned, the NFC device 12 preferably operates at a short range communication format of magnetic induction or inductive coupling.

The NFC hand-held device or key fob 12 may include in some embodiments the microcontroller or controller 18, the transceiver 16 for transmitting at the short range communication format at a low-power setting, the transceiver 16 transmitting at a medium range communication format at a high-power setting, a memory (in the controller 18), and a power supply or battery 17. The transmissions are transmitted through the transceivers 16 and 36. The power supply, such as the battery 17, provides power to the components of the NFC device 12. As with other key fobs, all of the components are preferably contained within the housing 13.

The NFC interface may have a range of a number of centimeters. The close range communication with the NFC interface may take place via magnetic field induction, allowing the NFC interface to communicate with other NFC interfaces or to retrieve information from fobs having radio frequency identification (RFID) circuitry. The NFC interface may provide a manner of initiating or facilitating a transfer of user data from one receiver to another receiver.

Similar to the descriptions above, other communication protocols are available. These include Wireless Fidelity (Wi-Fi). Wi-Fi is capable of a range of many meters.

Another communication protocol is Bluetooth. Bluetooth is a standard wire-replacement communications protocol primarily designed for low-power consumption, with a short range based on low-cost transceiver microchips in each device. Because the devices use a radio (broadcast) communications system, they do not have to be in visual line of sight of each other. Range for 4.2 Bluetooth LE beacons (BLE 4.2) is power-class-dependent as shown in the following table:

| Power Class | Max. Permitted Power (mW) | (dBm) | Typ. range (m) |
|---|---|---|---|
| 1 | 100 | 20 | ~100 |
| 2 | 2.5 | 4 | ~10 |
| 3 | 1 | 0 | ~1 |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for remotely opening a land vehicle door which moves through a volume of space defined by an opening envelope when the door moves from its closed position to its open position, the system comprising:
   a mobile communication device supported on the vehicle for movement therewith and operative to produce a first signal in the form of a first electromagnetic field over a volume of space outside and adjacent the vehicle and defined by a field envelope;
   a hand-held communication device operative to detect the first electromagnetic field and produce a second signal in the form of a second electromagnetic field when the hand-held device is located within the field envelope, the mobile device being operative to remove identification data from the second signal, the identification data identifying the hand-held device; and
   control logic coupled to the mobile device, and being operative to determine if the hand-held device is an authorized hand-held device based on the identification data, the control logic being operative to determine if a pedestrian carrying an authorized hand-held device is located within the field envelope and to generate a door-opening command signal when the authorized device is located within the field envelope for a predetermined period of time wherein the mobile device is supported on the vehicle so that the opening envelope is in non-overlapping relationship to the field envelope.

2. The system as claimed in claim 1, wherein the control logic is further operative to issue an illumination signal to actuate a source of light to illuminate an area externally of the vehicle for a pedestrian carrying an authorized hand-held device to identify where the pedestrian can safely stand during opening of the door.

3. The system as claimed in claim 2, wherein the source of light illuminates a ground surface adjacent the vehicle.

4. The system as claimed in claim 2, wherein the opening envelope is in non-overlapping relationship with the illuminated area.

5. The system as claimed in claim 2, wherein the source of light is supported within a housing of a tail-light assembly of the vehicle.

6. The system as claimed in claim 1, wherein the door is a gull-wing door.

7. The system as claimed in claim 1, wherein the door is a tailgate.

8. The system as claimed in claim 1, wherein the hand-held device comprises a key fob.

9. The system as claimed in claim 1, further comprising a source of sound supported on the vehicle to emit sound which can be heard outside and adjacent to the vehicle to warn a pedestrian carrying an authorized hand-held device to stay out of the opening envelope.

10. A system for remotely opening a land vehicle door which moves through a volume of space defined by an opening envelope when the door moves from its closed position to its open position, the system comprising:
    a mobile communication device supported on the vehicle for movement therewith and operative to produce a first signal in the form of a first electromagnetic field over a volume of space outside and adjacent the vehicle and defined by a field envelope;
    a hand-held communication device operative to detect the first electromagnetic field and produce a second signal in the form of a second electromagnetic field when the hand-held device is located within the field envelope, the mobile device being operative to remove identification data from the second signal, the identification data identifying the hand-held device; and
    control logic coupled to the mobile device, and being operative to determine if the hand-held device is an authorized hand-held device based on the identification data, the control logic being operative to determine if a pedestrian carrying an authorized hand-held device is located within the field envelope and to generate a door-opening command signal when the authorized device is located within the field envelope for a predetermined period of time wherein the hand-held device includes a motion sensor operative to provide a motion signal as a function of lack of motion of a pedestrian carrying the hand-held device within the field envelope for the predetermined period of time.

11. A system for remotely opening a land vehicle door which moves through a volume of space defined by an opening envelope when the door moves from its closed position to its open position, the system comprising:
    a mobile communication device supported on the vehicle for movement therewith and operative to produce a first signal in the form of a first electromagnetic field over a volume of space outside and adjacent the vehicle and defined by a field envelope;
    a hand-held communication device operative to detect the first electromagnetic field and produce a second signal in the form of a second electromagnetic field when the hand-held device is located within the field envelope, the mobile device being operative to remove identification data from the second signal, the identification data identifying the hand-held device;
    a source of light supported on the vehicle to illuminate an area externally of the vehicle for viewing by a pedestrian carrying an authorized hand-held device to identify a location where the pedestrian can safely stand during opening of the door; and
    control logic coupled to the mobile device and being operative to determine if the hand-held device is an authorized hand-held device based on the identification data, the control logic being operative to determine if a pedestrian carrying an authorized hand-held device is located within the field envelope and to generate a door-opening command signal when the authorized device is located within the field envelope for a predetermined period of time wherein the mobile device is supported on the vehicle so that the opening envelope is in non-overlapping relationship to the field envelope.

12. The system as claimed in claim 11, wherein the source of light illuminates a ground surface adjacent the vehicle.

13. The system as claimed in claim 11, wherein the opening envelope is in non-overlapping relationship with the illuminated area.

14. The system as claimed in claim 11, wherein the door is a gull-wing door.

15. The system as claimed in claim 11, wherein the door is a tailgate.

16. The system as claimed in claim 11, wherein the hand-held device comprises a key fob.

17. The system as claimed in claim 11, wherein the source of light is supported within a housing of a tail-light assembly of the vehicle.

18. The system as claimed in claim 11, further comprising a source of sound supported on the vehicle to emit sound which can be heard outside and adjacent to the vehicle to warn a pedestrian carrying an authorized hand-held device to stay out of the opening envelope.

* * * * *